UNITED STATES PATENT OFFICE.

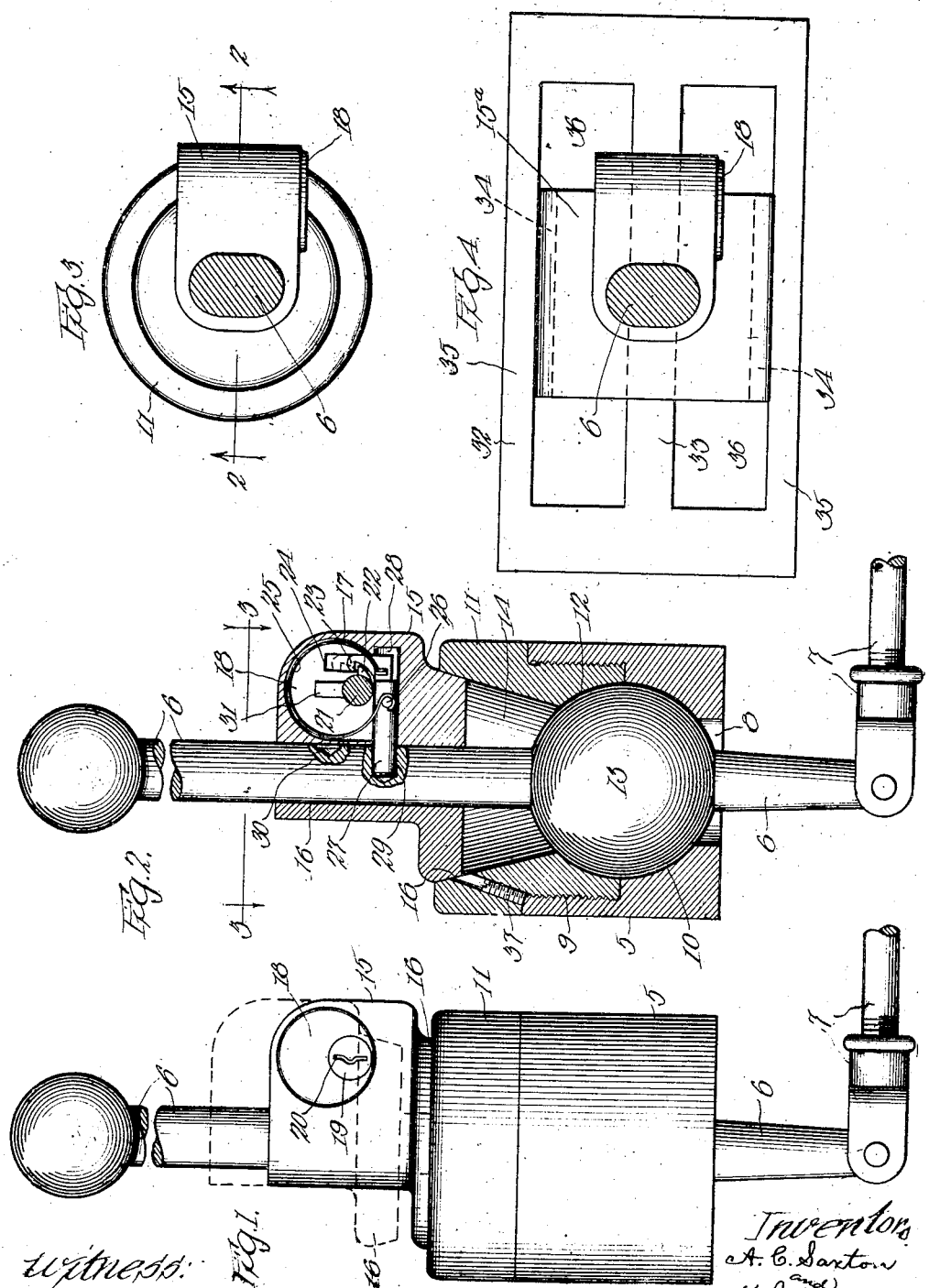

AUGUSTUS C. SAXTON AND HENRY J. MENARD, OF CHICAGO, ILLINOIS, ASSIGNORS TO W. R. DAWES, TRUSTEE, OF CHICAGO, ILLINOIS.

LOCK FOR CONTROLLING-LEVERS.

1,302,976.  Specification of Letters Patent.  Patented May 6, 1919.

Application filed December 27, 1915. Serial No. 68,612.

*To all whom it may concern:*

Be it known that we, AUGUSTUS C. SAXTON and HENRY J. MENARD, citizens of the United States, and residents of Chicago, in the county of Cook and State of Illinois, have invented certain new and useful Improvements in Locks for Controlling-Levers, of which the following is a specification.

This invention relates to improvements in a locking device, which, while it is more particularly designed and intended for use in connection with and for locking the controlling-levers of automobiles, and in the accompanying drawing is so shown, and will hereinafter be so described, yet it is applicable for use in connection with controlling-levers for other kinds of machines or machinery, and it consists in certain peculiarities of the construction, novel arrangement and operation of the various parts thereof, as will be hereinafter more fully set forth and specifically claimed.

The principal object of the invention is to provide a locking device of the above mentioned general character, which shall be simple and inexpensive in construction, strong, durable and efficient in operation, and so made that it can be readily mounted on the machine at a suitable point convenient to the operator for his manipulation in starting, changing the speed and stopping the machine. Another object is to provide means for quickly, and virtually automatically locking the lever in a fixed neutral position, to the end, that the machine can not be operated by unauthorized persons, yet so that the lever may be readily released and the lock maintained in such position with respect to the lever as to enable the latter to be freely operated.

Other objects and advantages of the invention will be disclosed in the subjoined description and explanation.

In the accompanying drawing which serves to illustrate the invention—

Figure 1 is a view in side elevation of a lock for controlling levers embodying our invention and illustrating by full lines the parts in the positions they will assume when the lever is locked in a neutral position and by dotted lines the position that one member of the lock will occupy when the lever is released and allowed to move in any direction.

Fig. 2 is a vertical sectional view taken on line 2—2 of Fig. 3 looking in the direction indicated by the arrows, the lever in said view as well as in Fig. 1 being shortened for the convenience of illustration.

Fig. 3 is a plan sectional view taken on line 3—3 of Fig. 2 and

Fig. 4 is a plan view partially in section showing a modification in the construction of the device.

Like numerals of reference refer to corresponding parts throughout the different views of the drawing.

The reference numeral 5 designates the support or body for the controlling lever 6 which lever is pivotally connected at its lower end or portion to a connection 7 which leads to the transmission gearing of the automobile or machine, which gearing is not shown. The support of body 5 may be suitably mounted on the machine at a convenient point within reach of the chauffeur or operator, and is as clearly shown in Fig. 2 of the drawing said support or body is provided in its lower portion with a vertical opening 8 which is considerably larger than the levers 6 so as to permit of free movement thereof. The upper portion of the body or support 5 is provided with an internally screw-threaded cavity 9 which communicates at its lower end with a concave cavity 10 with which the member 5 is provided between the upper end of the opening 8 and the lower end of the cavity 9, in which cavity is screw-threaded the lower portion of a plug or block 11 which has in its lower portion a concave cavity 12, which latter cavity together with the cavity 10, when the plug 11 is screwed down, will form a circular socket for the reception of a sphere or ball 13 with which the controlling lever 6 is provided. Extended from the upper surface of the plug or block 11 is a downwardly tapered opening 14, which, as shown in Fig. 2 of the drawing is considerably larger than the said lever. This ball or sphere 13 may be formed integrally with the lever 6 or it may be mounted thereon and secured thereto in any suitable manner. Slidably mounted on the lever 6 above the plug or block 11 is a lock carrying member 15 which has its lower portion downwardly tapered as at 16 to correspond with the taper of the opening 14 an to fit therein. The member 15 may be of any suitable size and shape, but by preference of the shape shown in the drawing, that is, substantially rectangular in shape. At one side of the opening 16 in the member 15, through which opening the lever 6 is extended, said member is provided with a transverse opening or socket 17 in which is fitted the barrel 18 of a lock of the ordinary or any preferred construction, which barrel has in its outer end a plate 19 provided with a key hole 20 for the reception of a key to be used for engaging and turning a bolt 21 which is longitudinally and rotatably located in the lower portion of the lock barrel. This bolt is provided at about its middle with a laterally extended lug 22 to engage the upper or hooked end of a tumbler 23 which is adapted to operate vertically within a slot or guide-way 24 formed in the barrel 18 of the lock. Secured to the lower end of the tumbler 23 is one end of a circular spring 25 which is located within the barrel 18 at about its middle and is secured at its other end to a forwardly extending pin 26 which projects from the bolt 27 which latter bolt is adapted to operate in a suitable recess or guide-way 28 formed in the lower portion of the barrel 18 as well as in the member 15 just below the rod 21 and at a right angle thereto. At a suitable point to receive the end of the bolt 27, the lever 6 is provided with a recess or socket 29, and above said recess or socket with another recess 30, which is quite shallow and has its walls tapered to a point as shown in Fig. 2, to correspond with the tapered or beveled end of the bolt 27, which is adapted to fit in the socket 30 when the lock-carrying-member 15 is raised to the position shown by dotted lines in Fig. 1 of the drawing, and to hold said member in such position, thus releasing the lever from the plug or block 11, and allowing it to be moved freely in any direction. The rod or bolt 21 is provided with an arm 31 which is so located that when the rod 21 is turned in the proper direction, the said arm will strike the pin 26 and thus allow the locking bolt 27 to be retracted from engagement with the recess 29 in the lever, so that the member 15 may be slid upwardly on the lever until the pointed end of the bolt 27 reaches the recess 30, when by reason of the action of the spring 25, said bolt will be forced into the last named recess and thus hold the tapered portion 16 of the member 15 in and about the position indicated in Fig. 1 or out of engagement with the plug 11 of the lever support. As the rod 21 is rotated by a key to the lock, it is obvious that the lug 22 will engage the upper end of the tumbler 23 and move the same upwardly out of the guide-way 28 so as to permit the locking bolt 27 to be retracted therein.

It is further apparent, that when the lock-carrying-member 15 is released from the plug 11 of the support for the controlling lever, the latter, by reason of the enlarged openings 8 and 14, in the said support and in the plug 11 respectively can be moved in any direction on its bearing 13, so as to start the machine, to regulate its speed, to reverse its motion or to stop the same. When it is desired to lock the controlling lever, the same should be brought to a vertical position, when by forcing the member 15 downwardly by applying pressure thereto, it is evident that the reduced portion 16 of the member 15 will fit closely in the opening 14 of the plug 11, so as to prevent any movement of the lever, and that as the member 15 is slid downwardly, the bolt 27 will be withdrawn from the recess 30 by reason of the beveled free end of said bolt, until the latter reaches the recess 29, when it will be automatically projected into said recess by the action of the spring 25, and locked in said position. In Fig. 4 of the drawing is shown a modification in the construction of our locking mechanism, which consists in employing an H bar 32 of the ordinary or well known construction, which is mounted on the machine at a suitable point, and dispensing with the body or support 5, plug 11, and ball 13 on the lever, in this modification the lever 6 is extended upwardly through a space or opening between the adjacent ends of the middle member 33 of the H bar and has slidably mounted thereon above said bar, a lock-carrying-member 15$^a$ which is equipped with a lock barrel 18 and locking mechanism similar to that just above described and illustrated in Fig. 2 of the drawing. The member 15$^a$ has at each of its sides a downwardly extended portion 34 to normally engage the inner edges of the outer members 35 of the H bar, but it will be understood, that by raising the member 15$^a$ upwardly a sufficient distance the portions 34 will be disengaged from the members 35 so that the lever 6 can be tilted to either side of the member 33 and moved back and forth in the slots 36 so as to operate the transmission gearing as may be desired.

Having thus fully described our invention, what we claim as new and desire to secure by Letters Patent is—

1. In a device of the class described, a lever, a support therefor, said support being provided in its upper portion with an opening surrounding said lever, having downwardly and inwardly inclined walls and a locking member carried by said lever, the outer walls of which being downwardly and inwardly inclined and adapted to engage the walls of the opening in said support.

2. In a device of the class described, a lever, a support therefor provided in its upper portion with an inverted conical chamber surrounding said lever and a locking member carried by said lever having a conical extension adapted to engage the walls of said chamber when moved into position.

3. In a lock for controlling-levers, the combination with a suitably mounted body or support for the lever, the said body having a vertical opening extended therethrough and provided in its lower portion with a concave cavity, an apertured plug fitted in the upper portion of said opening and having in its lower portion a concaved cavity and in this upper portion an outwardly tapered opening of a lever having suitable connection with the mechanism to be operated thereby and provided above said support with a pair of sockets located one above the other, a rounded enlargement on the lever and having its bearings in the concaved portions of the support, a lock-carrying-member slidably mounted on the lever above the support and having downwardly tapered means to engage said tapered opening therein when lowered, a spring-actuated locking bolt mounted on said member and adapted to engage the sockets in the lever, and means to retract said bolt.

4. In a device of the class described, a support comprising an upper and lower member, a lever universally mounted therein, a locking member carried by said lever adapted to prevent the movement of said lever or the removal of the upper member of said support.

5. In a device of the class described, a support, a control lever universally mounted therein, a lock carrying casing surrounding said lever and slidably mounted thereon, pressure yielding means for holding the lock carrying casing in an inoperative position on the lever, and means adapted to automatically lock said casing on the control lever in an operative position when the casing is moved to its locking position.

6. In a lock for controlling levers, a lock carrying case provided with a central bore for receiving a control lever upon which the casing is adapted to be slidably mounted, a lock in said casing, spring pressed means for yieldably holding said lock carrying casing on the lever in an inoperative position, said means being adapted to readily permit the casing to be moved to locking-position by merely applying downward pressure to the casing, and means for automatically locking said casing to the control lever in an operative position.

AUGUSTUS C. SAXTON.
HENRY J. MENARD.

Witnesses:
CHAS. C. TILLMAN,
A. E. OLSON.